United States Patent
Takano et al.

(10) Patent No.: US 6,698,793 B2
(45) Date of Patent: Mar. 2, 2004

(54) VEHICLE BODY STRUCTURE, VEHICLE HAVING THE STRUCTURE, METHOD FOR MOUNTING STEERING COLUMN ON VEHICLE BODY, AND VEHICLE MANUFACTURED USING THE MOUNTING METHOD

(75) Inventors: Akira Takano, Tokyo (JP); Hikaru Sunohara, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 8 days.

(21) Appl. No.: 10/079,491

(22) Filed: Feb. 22, 2002

(65) Prior Publication Data

US 2002/0117842 A1 Aug. 29, 2002

(30) Foreign Application Priority Data

Feb. 23, 2001 (JP) .................................... 2001-048875

(51) Int. Cl.[7] .............................................. B60R 21/02
(52) U.S. Cl. ...................................... 280/748; 280/779
(58) Field of Search ................................ 280/748, 752, 280/750, 777, 779; 296/70, 72

(56) References Cited

U.S. PATENT DOCUMENTS

| 4,978,136 | A | * | 12/1990 | Tomita et al. | ............... | 280/751 |
| 5,238,286 | A | * | 8/1993 | Tanaka et al. | ................. | 296/70 |
| 6,073,965 | A | * | 6/2000 | Kinoshita et al. | ........... | 280/775 |
| 6,152,489 | A | * | 11/2000 | Hedderly et al. | ........... | 280/779 |
| 6,450,533 | B1 | * | 9/2002 | Kimura et al. | ............... | 280/779 |
| 6,481,786 | B1 | * | 11/2002 | Kim | ...................... | 296/203.02 |

FOREIGN PATENT DOCUMENTS

JP 6-247322 9/1994

* cited by examiner

Primary Examiner—Eric Culbreth
Assistant Examiner—Faye M. Fleming
(74) Attorney, Agent, or Firm—McGinn & Gibb, PLLC

(57) ABSTRACT

An instrument panel extends in the widthwise direction of a vehicle body, and is vertically separated into an upper panel and a lower panel. A bolt member for fastening a column-mounting bracket and a column holder is independently fixed to the column-mounting bracket and to the column holder. In a state in which the bolt member is fixed to the column holder, a first nut member is screwed onto a first externally-threaded portion from above the lower panel mounted on the vehicle body, thereby fastening the column holder to the column-mounting bracket.

17 Claims, 5 Drawing Sheets

VEHICLE BODY STRUCTURE, VEHICLE HAVING THE STRUCTURE, METHOD FOR MOUNTING STEERING COLUMN ON VEHICLE BODY, AND VEHICLE MANUFACTURED USING THE MOUNTING METHOD

BACKGROUND OF THE INVENTION

1. Field of the Invention

The present invention relates to a vehicle body structure in which a column-mounting bracket for mounting a steering column is placed inside an instrument panel, to a vehicle having the body structure, to a method for mounting the steering column on the vehicle body, and to a vehicle manufactured using the mounting method.

2. Description of the Related Art

As disclosed in, for example, Japanese Patent Laid-open Hei 6-247322, a steering column is mounted on a vehicle body via a column-mounting bracket fixed to a steering support beam. In this case, a column holder is fixed to the column-mounting bracket with bolt members or the like, and the steering column is mounted on the vehicle body while being held in the column holder.

In general, an instrument panel is formed of a large one-piece member. For this reason, when the steering column is fixed to the vehicle body before the instrument panel is mounted, it is difficult to carry the instrument panel into a vehicle cabin due to the long steering column fixed in the vehicle cabin. It is also difficult to mount the instrument panel on the vehicle body in such a state.

Accordingly, in a normal vehicle-body assembly process, the steering column is mounted after the instrument panel is installed. In such a case, a work opening is formed in the lower part of the instrument panel, and a mechanic mounts the steering column while observing the inside of the instrument panel through the work opening.

However, when the mechanic mounts the steering column in the manner as described above, working efficiency declines, and a heavy load is imposed on the mechanic. Moreover, since the mechanic maintains an unnatural posture during the mounting operation, mounting accuracy of the steering column may deteriorate.

SUMMARY OF THE INVENTION

The present invention has been made in view of the above circumstances, and an object of the invention is to provide a vehicle body structure which can enhance the mounting efficiency and accuracy of a steering column, a vehicle having the vehicle body structure, a method for mounting the steering column on the vehicle body, and a vehicle manufactured using the mounting method.

In order to achieve the above object, according to an aspect of the present invention, there is provided a vehicle body structure including: an instrument panel extending in the widthwise direction of a vehicle body, and vertically separated into an upper panel and a lower panel which are individually mounted on the vehicle body; a column-mounting bracket fixed to the vehicle body inside the instrument panel; and a steering column mounted on the vehicle body with the column-mounting bracket therebetween.

Further objects, features and advantages of the present invention will become apparent from the following description of the preferred embodiments with reference to the attached drawings.

DETAILED DESCRIPTION OF THE PREFERRED EMBODIMENTS

An embodiment of the present invention will be described below with reference to the attached drawings.

Figure 1:
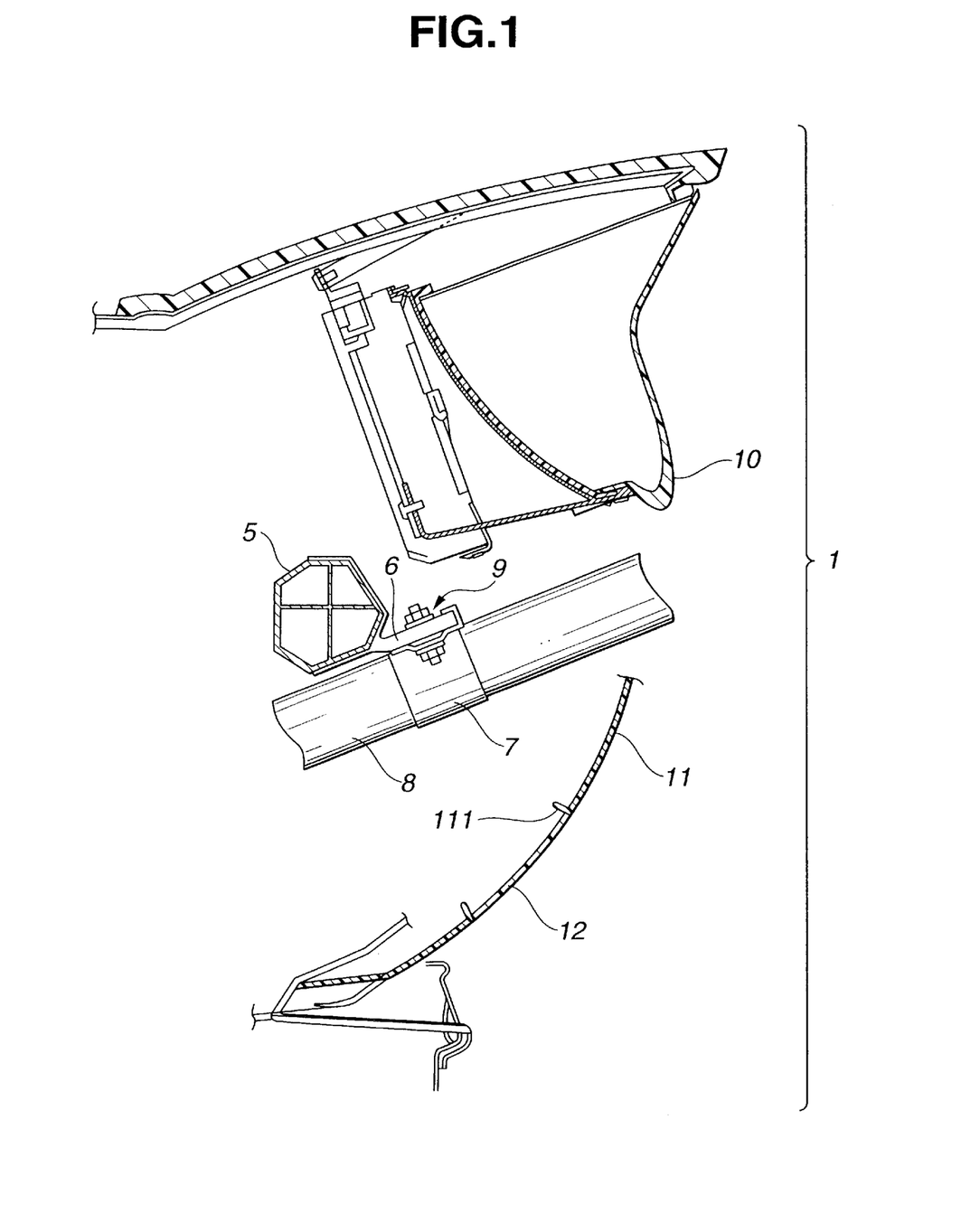
FIG. 1 is a sectional view showing the principal part of an instrument panel adjacent to a steering column.

Referring to FIG. 1, inside an instrument panel 1 of a vehicle body which constitutes a vehicle, a steering support beam 5 extends in the widthwise direction of the vehicle body, and is attached to the vehicle body.

A column-mounting bracket 6 is fixed on the steering support beam 5 by welding or by other means so that it is placed offset from the steering support beam 5 toward the rear side of the vehicle body. A column holder 7 is fastened to the column-mounting bracket 6 with a pair of fastening members 9. A steering column 8 is held between the column-mounting bracket 6 and the column holder 7.

Figure 3:
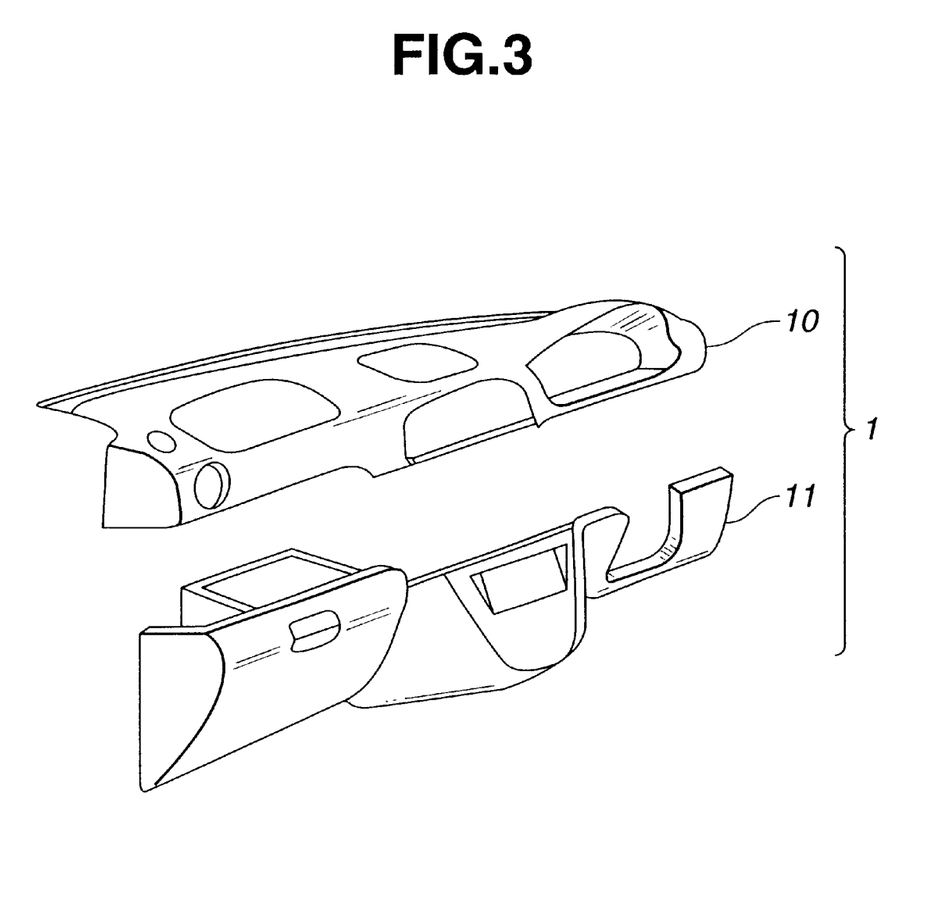
FIG. 3 is an exploded perspective view of the instrument panel.

As shown in FIG. 3, the instrument panel 1 extends in the widthwise of the vehicle body, and is vertically separated into an upper panel 10 and a lower panel 11. The upper and lower panels 10 and 11 are individually mounted on the vehicle body. In this case, the upper panel 10 and the lower panel 11 are vertically separated at least adjacent to the column-mounting bracket 6 on the side of the driver's seat.

A work opening 111 is formed in the lower part of the lower panel 11, as shown in FIG. 1. Inside the instrument panel 1, the column holder 7 faces the upper side of the work opening 111. A lid 12 closes the work opening 111.

Figure 2:
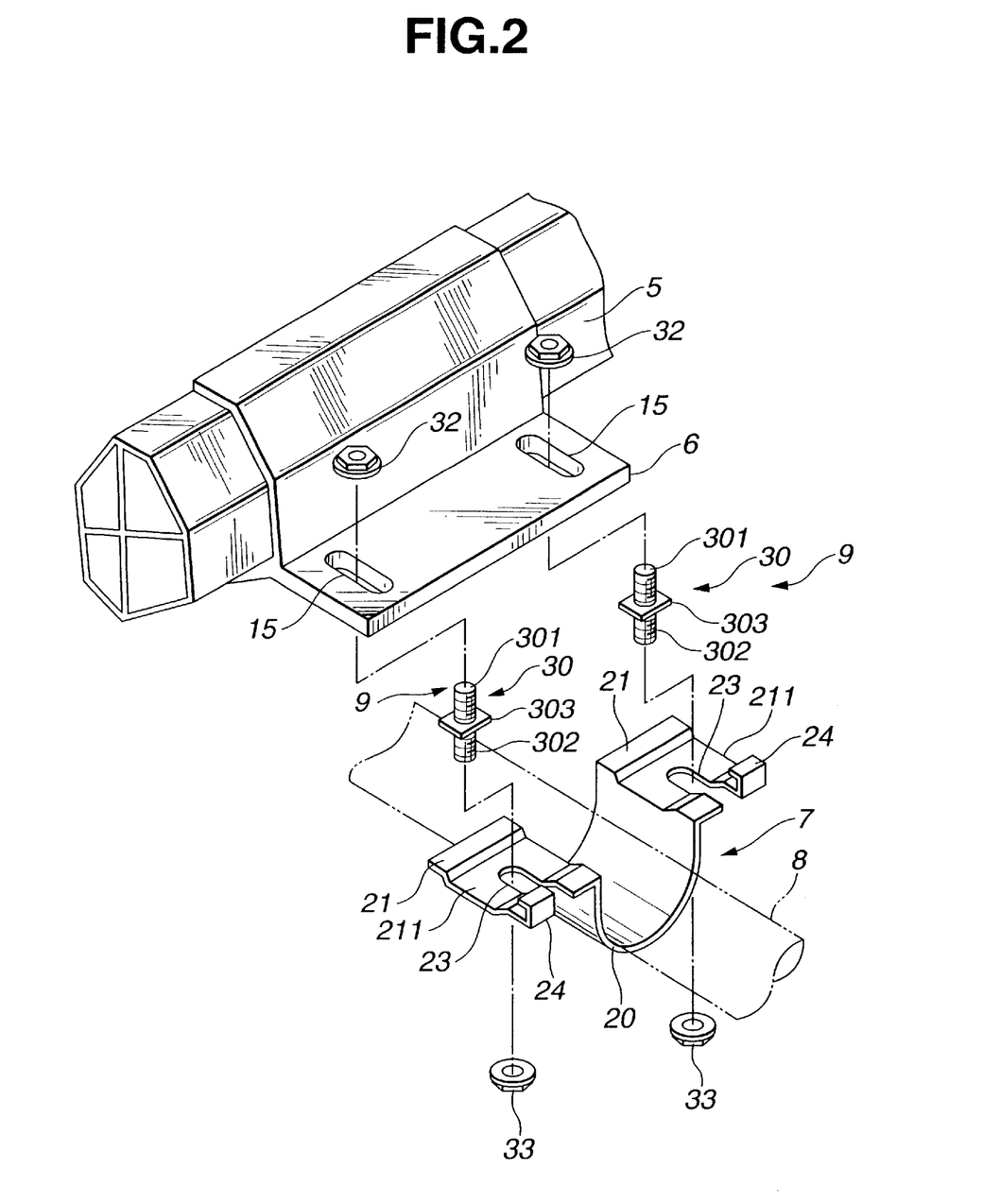
FIG. 2 is an exploded perspective view of a column-mounting bracket and a column holder.

As shown in FIG. 2, the column-mounting bracket 6 is made of a rectangular plate, and has, adjacent to both sides, first bolt holes 15 shaped like a slot extending in the lengthwise direction of the vehicle body. The first bolt holes 15 may be formed of a U-shaped groove which is opened at the rear end of the column-mounting bracket 6.

The column holder 7 includes a holder portion 20 curved in a U-shape along the outer periphery of the steering column 8, and flange portions 21 formed at both ends of the holder portion 20.

The flange portions 21 are shaped so that they can be in contact with the back surface of the column-mounting bracket 6. The flange portions 21 have second bolt holes 23 formed corresponding to the first bolt holes 15. The second bolt holes 23 are formed of a U-shaped groove extending in the lengthwise direction of the vehicle body, and are opened at the rear ends of the flange portions 21. At the rear ends of the flange portions 21, retaining claws 24 are formed so as to be retained on the column-mounting bracket 6.

The fastening members 9 can be independently fastened in the first bolt holes 15 of the column-mounting bracket 6 and the second bolt holes 23 of the column holder 7.

More specifically, each of the fastening members 9 has a bolt member 30. The bolt member 30 includes a first externally-threaded portion 301 to be passed through the first bolt hole 15, a second externally-threaded portion 302 to be passed through the second bolt hole 23, and a flange portion 303 formed integrally with the bases of the first and second externally-threaded portions 301 and 302.

The fastening member 9 also has a first nut member 32. By screwing the first nut member 32 on the first externally-threaded portion 301 with the first externally-threaded portion 301 passed through the first bolt hole 15, the bolt member 30 is fastened to the column-mounting bracket 6 (see FIG. 5). That is, the column-mounting member 6 is clamped between the first nut member 32 and the flange portion 303, and the bolt member 30 is thereby fixed to the column-mounting bracket 6.

The fastening member 9 also has a second nut member 33. By screwing the second nut member 33 on the second externally-threaded portion 302 with the second externally-threaded portion 302 passed through the second bolt hole 23, the bolt member 30 is fastened to the column holder 7 (see FIG. 4). That is, the flange portion 21 is clamped between the second nut member 33 and the flange portion 303, and the bolt member 30 is thereby fixed to the column holder 7. The bolt member 30 is fastened at a step portion 211 formed in the flange portion 21, so that the flange portion 21 and the flange portion 303 are flush with each other.

A procedure for mounting the above-described components on a vehicle-body assembly line or the like will now be described. When attaching the steering column 8 to the column-mounting bracket 6, a mechanic first fixedly mounts the lower panel 11 onto the vehicle body.

Next, the mechanic fixes the column holder 7 to the column-mounting bracket 6 with the fastening members 9. The steering column 8 is thereby held by the column-mounting bracket 6.

When the operation of attaching the steering column 8 to the column-mounting bracket 6 is completed, the mechanic mounts the upper panel 10 on the vehicle body.

Figure 4:
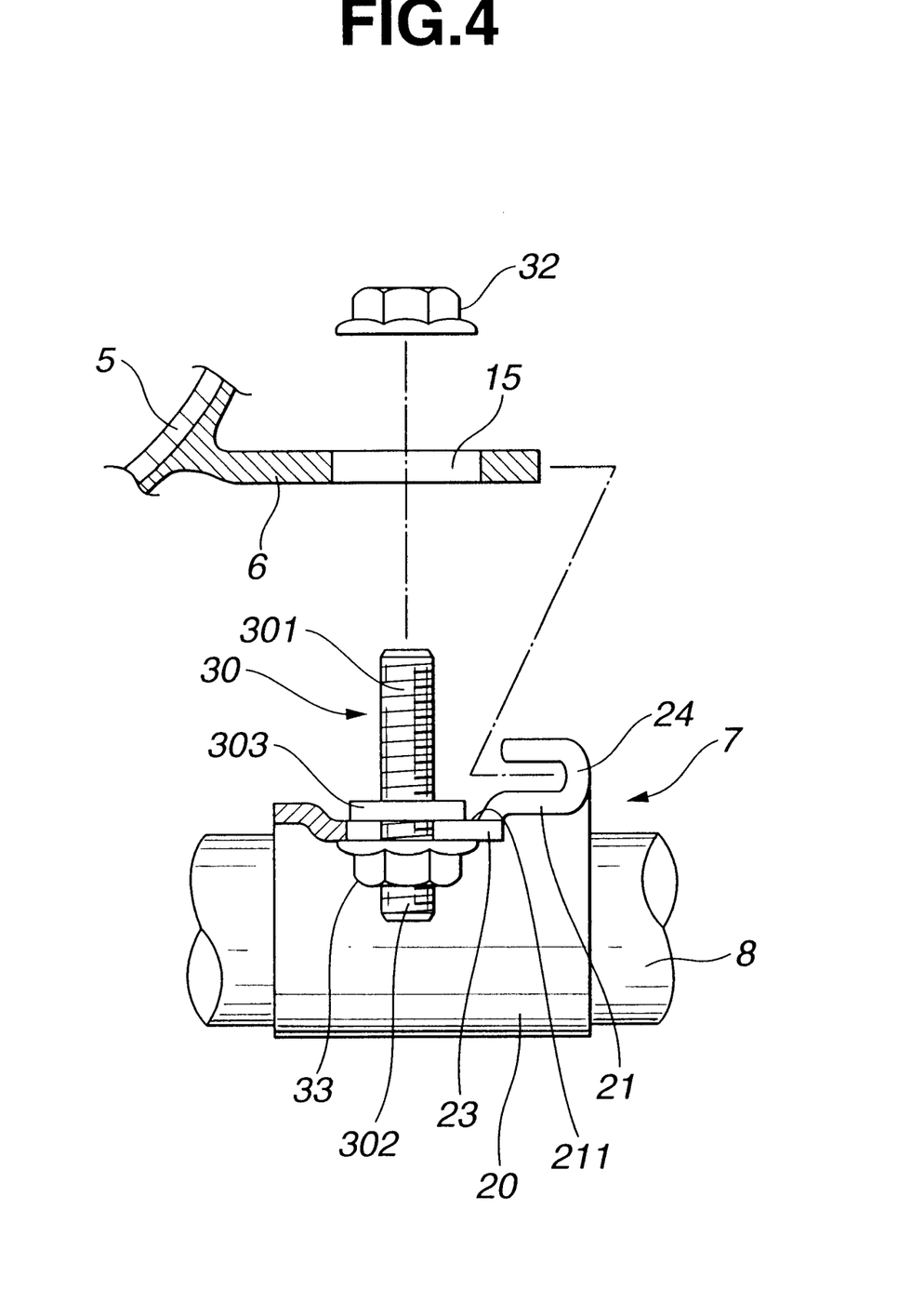
FIG. 4 is an explanatory view showing a state in which the column holder is attached.

More specifically, the steering column 8 is attached to the column-mounting bracket 6 through the following procedure:

The mechanic first fastens the bolt members 30 to the flange portions 21 of the column holder 7, as shown in FIG. 4. That is, the mechanic passes the second externally-threaded portions 302 through the second bolt holes 23, and fastens the second nut members 33 on the second externally-threaded portions 302. The operation of fastening the bolt members 30 to the column holder 7 is performed, for example, outside the vehicle in order to enhance the working efficiency.

Subsequently, the mechanic temporarily joins the column holder 7 to the column-mounting bracket 6. That is, the mechanic passes the first externally-threaded portions 301 through the first bolt holes 15 with the steering column 8 held in the holder portion 20, and retains the retaining claws 24 on the column-mounting bracket 6.

The mechanic then fastens the bolt members 30 to the column-mounting bracket 6. That is, the mechanic positions the column holder 7 with respect to the column-mounting bracket 6, and then screws the first nut members 32 on the first externally-threaded portions 301.

Through the above procedure, the column holder 7 is fastened to the column-mounting bracket 6, and the steering column 8 is attached to the column-mounting bracket 6.

The operation of temporarily attaching the column holder 7 to the column-mounting bracket 6 and the operation of screwing the first nut members 32 on the first externally-threaded portions 301 are performed from above the lower panel 11 in order to enhance the working efficiency.

During the repair of the vehicle or in other cases, the steering column 8 mounted on the vehicle body is detached, for example, through the following procedure:

The mechanic first removes the lid 12 from the lower panel 11 so as to open the work opening 111.

Figure 5:
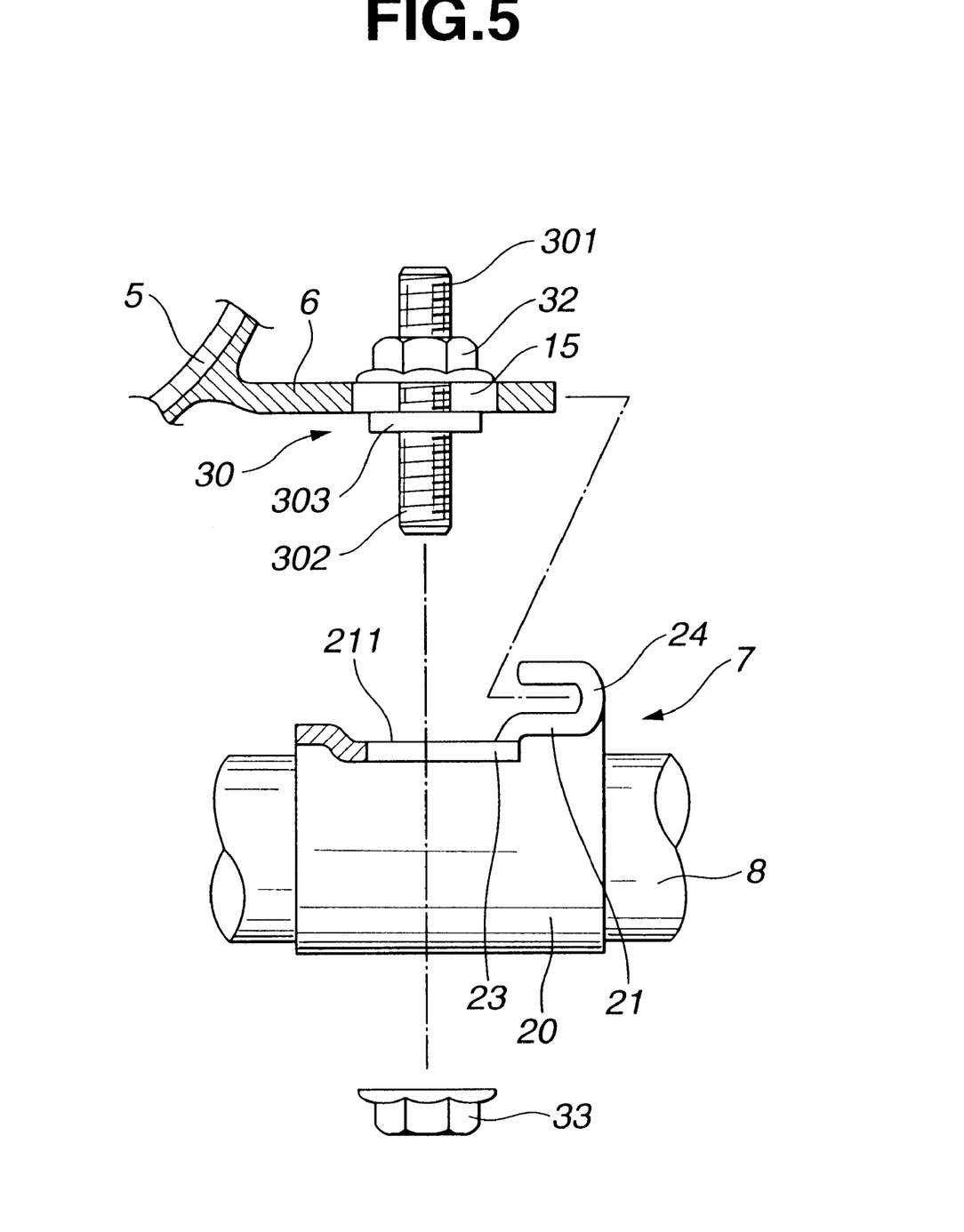
FIG. 5 is an explanatory view showing a state in which the column holder is detached.

Next, the mechanic unscrews the second nut members 33 from the second externally-threaded portions 302 through the work opening 111 (see FIG. 5).

Subsequently, the mechanic moves the column holder 7 forward and rearward along the second bolt holes 23, releases the column-mounting bracket 6 from the retaining claws 24, and removes the second externally-threaded portions 302 from the second bolt holes 23.

In this way, the steering column 8 can be detached without separating the upper panel 10 from the vehicle body.

Conversely, during the repair of the vehicle or in other cases, the detached steering column 8 can be attached to the column-mounting bracket 6 through the work opening 111 without separating the upper panel 10 from the vehicle body through the procedure opposite to that in the above detaching operation.

In a case in which there is a need to separate the upper panel 10 from the vehicle body during the repair or in other cases, the steering column 8 may also be detached and attached by performing the operations of unscrewing and screwing the first nut members 32 from and onto the first externally-threaded portions 301 from above the lower panel 11.

In the above-described embodiment, the instrument panel 1 extends in the widthwise direction of the vehicle body and is vertically separated into the upper panel 10 and the lower panel 11. When attaching the steering column 8 to the column-mounting bracket 6 on the vehicle-body assembly line or the like, the lower panel 11 is mounted on the vehicle body, the steering column 8 is mounted from above the lower panel 11, and the upper panel 10 is then mounted on the vehicle body. Therefore, the mechanic need not maintain an unnatural posture during the mounting operation, and this enhances the working efficiency.

In this case, since the large-sized instrument panel 1 is divided into the upper panel 10 and the lower panel 11, the upper panel 10 can be easily carried into the cabin and be mounted on the vehicle body even after the steering column 8 is mounted.

The above-described enhancement of the working efficiency increases the mounting accuracy of the steering column 8.

When the steering column 8 is attached to the column-mounting bracket 6 with the column holder 7 therebetween, the bolt members 30 for fastening the column-mounting bracket 6 and the column holder 7 can be independently fixed to the column-mounting bracket 6 and to the column holder 7. This enhances the mounting efficiency of the steering column 8. That is, since the column holder 7 can be attached or detached onto or from the column-mounting bracket 6 both from above the column-mounting bracket 6 and from below the column holder 7, working efficiency is enhanced.

More specifically, on the vehicle-body assembly line or the like, the operations of attaching and detaching the steering column 8 from above the lower panel 11 are performed by screwing and unscrewing the first nut members 32 onto and from the first externally-threaded portions 301 in a state in which the bolt members 30 are fixed to the column holder 7. Therefore, the operations are easily performed. In other words, since the steering column 8 is attached and detached from above the lower panel 11 by screwing and unscrewing the first nut members 32 placed on the column-mounting bracket 6, working efficiency can be enhanced.

Conversely, during the repair of the vehicle or in other cases, the operations of attaching and detaching the steering column 8 through the work opening 111 formed in the lower part of the lower panel 11 are performed by screwing and unscrewing the second nut members 33 on or from the second externally-threaded portions 302 in a state in which the bolt members 33 are fixed to the column-mounting bracket 6. Therefore, the operations are easily performed. In other words, since the steering column 8 is attached and detached without separating the upper panel 10 after the vehicle has been assembled, by screwing and unscrewing the second nut members 33 placed under the column holder 7, working efficiency can be enhanced.

Since at least one of the first bolt holes 15 and the second bolt holes 23 are formed of a U-shaped groove which is opened at one end, it is possible to easily perform the operations of passing and detaching the first externally-threaded portions 301 or the second externally-threaded portions 302 through or from the first bolt holes 15 or the second bolt holes 23, and to enhance the working efficiency of the mounting operation of the steering column 8.

Since the column holder 7 has the retaining claws 24 which can be retained on the column-mounting bracket 6, the column-mounting bracket 6 and the column holder 7 can be temporarily joined before fastening the fastening members 9. This can enhance the working efficiency of the mounting operation of the steering column 8.

While the lower panel 11, the steering column 8, and the upper panel 10 are mounted on the vehicle body in that order in the above-described embodiment, the present invention is not limited to the embodiment. For example, the upper panel 10, the steering column 8, and the lower panel 11 may be mounted in that order, the steering column 8, the upper panel 10, and the lower panel 11 may be mounted in that order, or the steering column 8, the lower panel 11, and the upper panel 10 may be mounted in that order.

Having described the preferred embodiments of the invention referring to the accompanying drawings, it should be understood that the present invention is not limited to those precise embodiments and various changes and modifications thereof could be made by one skilled in the art without departing from the spirit or scope of the invention as defined in the appended claims.

What is claimed is:

1. A vehicle body structure, comprising:
    an instrument panel extending in the widthwise direction of a vehicle body and vertically separated into an upper panel and a lower panel which are individually mounted on said vehicle body;
    a column-mounting bracket fixed on a steering support beam so as to be offset from said steering support beam toward a rear side of said vehicle body inside said instrument panel;
    a column holder for holding a steering column between said column holder and said column-mounting bracket;
    a bolt member comprising a first externally-threaded portion to be passed through a first bolt hole formed in said column-mounting bracket, a second externally-threaded portion to be passed through a second bolt hole formed in said column holder, and a flange, said first externally-threaded portion and said second externally-threaded portion being combined with said flange therebetween;
    a first nut member to be screwed onto said first externally-threaded portion from above said column-mounting bracket to fasten said bolt member to said column-mounting bracket; and
    a second nut member to be screwed onto said second externally-threaded portion from below said column holder to fasten said bolt member to said column holder,
    wherein said instrument panel is vertically separated into said upper panel and said lower panel at least in the vicinity of said column-mounting bracket.

2. The vehicle body structure according to claim 1, wherein at least one of said first bolt hole and said second bolt hole comprises a U-shaped groove which is opened at one end.

3. The vehicle having a vehicle body structure according to claim 1.

4. A vehicle body structure comprising:
    an instrument panel extending in the widthwise direction of a vehicle body and vertically separated into an upper panel and a lower panel which are individually mounted on said vehicle body;
    a column-mounting bracket fixed to said vehicle body inside said instrument panel; and
    a steering column mounted on said vehicle body with said column-mounting bracket therebetween,
    wherein said column holder comprises a retaining claw to be retained on said column-mounting bracket.

5. A vehicle body structure, comprising:
    an instrument panel extending in the widthwise direction of a vehicle body and vertically separated into an upper panel and a lower panel which are individually mounted on said vehicle body;
    a column-mounting bracket fixed to said vehicle body inside said instrument panel;
    a steering column mounted on said vehicle body with said column-mounting bracket therebetween;
    a column holder for holding said steering column; and
    a fastening member which is independently fastened to said column-mounting bracket and to said column holder so as to fix said column holder to said column-mounting bracket,
    wherein said column holder comprises a retaining claw to be retained on said column-mounting bracket.

6. A vehicle body structure, comprising:
    an instrument panel extending in the widthwise direction of a vehicle body and vertically separated into an upper panel and a lower panel which are individually mounted on said vehicle body;
    a column-mounting bracket fixed to said vehicle body inside said instrument panel;
    a steering column mounted on said vehicle body with said column-mounting bracket therebetween;
    a column holder for holding said steering column; and
    a fastening member which is independently fastened to said column-mounting bracket and to said column holder so as to fix said column holder to said column-mounting bracket;
    wherein said fastening member comprising:
    a bolt member including a first externally-threaded portion to be passed through a first bolt hole formed in said column-mounting bracket, a second externally-threaded portion to be passed through a second bolt hole formed in said column holder, and a flange, said first externally-threaded portion and said second externally-threaded portion being combined with said flange therebetween;

a first nut member to be screwed onto said first externally-threaded portion; and a second nut member to be screwed onto said second externally-threaded portion, wherein at least one of said first bolt hole and said second bolt hole comprises a U-shaped groove which is opened at one end, and wherein said column holder comprises a retaining claw to be retained on said column-mounting bracket.

7. A vehicle body structure, comprising:

an instrument panel extending in the widthwise direction of a vehicle body and vertically separated into an upper panel and a lower panel which are individually mounted on said vehicle body;

a column-mounting bracket fixed to said vehicle body inside said instrument panel;

a column holder for holding a steering column on said column-mounting bracket; and a fastening member which is independently fastened to said column-mounting bracket and to said column holder so as to fix said column holder to said column-mounting bracket, wherein said column holder comprises a retaining claw to be retained on said column-mounting bracket.

8. The vehicle body structure according to claim 7, wherein said fastening member comprising:

a bolt member including a first externally-threaded portion to be passed through a first bolt hole formed in said column-mounting bracket, a second externally-threaded portion to be passed through a second bolt hole formed in said column holder, and a flange, said first externally-threaded portion and said second externally-threaded portion being combined with said flange therebetween;

a first nut member to be screwed onto said first externally-threaded portion; and a second nut member to be screwed onto said second externally-threaded portion.

9. The vehicle body structure according to claim 8, wherein at least one of said first bolt hole and said second bolt hole comprises a U-shaped groove which is opened at one end.

10. The vehicle body structure according to claim 7, wherein said column mounting bracket is situated above said steering column.

11. The vehicle body structure according to claim 7, wherein said fastening member is oriented in a substantially downward direction substantially perpendicular to the steering column.

12. A vehicle body structure, comprising:

an instrument panel extending in the widthwise direction of a vehicle body and vertically separated into an upper panel and a lower panel which are individually mounted on said vehicle body;

a column-mounting bracket fixed to said vehicle body inside said instrument panel;

a column holder for holding a steering column on said column-mounting bracket; and a fastening member which is independently fastened to said column-mounting bracket and to said column holder so as to fix said column holder to said column-mounting bracket, wherein said column holder comprises a retaining claw to be retained on said column-mounting bracket.

13. A vehicle body structure, comprising:

an instrument panel extending in the widthwise direction of a vehicle body and vertically separated into an upper panel and a lower panel which are individually mounted on said vehicle body;

a column-mounting bracket fixed to said vehicle body inside said instrument panel;

a column holder for holding a steering column on said column-mounting bracket; and a fastening member which is independently fastened to said column-mounting bracket and to said column holder so as to fix said column holder to said column-mounting bracket;

wherein said fastening member comprises:

a bolt member including a first externally-threaded portion to be passed through a first bolt hole formed in said column-mounting bracket, a second externally-threaded portion to be passed through a second bolt hole formed in said column holder, and a flange, said first externally-threaded portion and said second externally-threaded portion being combined with said flange therebetween;

a first nut member to be screwed onto said first externally-threaded portion; and a second nut member to be screwed onto said second externally-threaded portion, and wherein said column holder comprises a retaining claw to be retained on said column-mounting bracket.

14. A vehicle body structure, comprising:

an instrument panel extending in the widthwise direction of a vehicle body and vertically separated into an upper panel and a lower panel which are individually mounted on said vehicle body;

a column-mounting bracket fixed to said vehicle body inside said instrument panel;

a column holder for holding a steering column on said column-mounting bracket; and a fastening member which is independently fastened to said column-mounting bracket and to said column holder so as to fix said column holder to said column-mounting bracket;

wherein said fastening member comprises:

a bolt member including a first externally-threaded portion to be passed through a first bolt hole formed in said column-mounting bracket, a second externally-threaded portion to be passed through a second bolt hole formed in said column holder, and a flange, said first externally-threaded portion and said second externally-threaded portion being combined with said flange therebetween;

a first nut member to be screwed onto said first externally-threaded portion; and a second nut member to be screwed onto said second externally-threaded portion, wherein at least one of said first bolt hole and said second bolt hole comprises U-shaped groove which is opened at one end, and wherein said column holder comprises a retaining claw to be retained on said column-mounting bracket.

15. A method for mounting a steering column on a vehicle body, comprising:

mounting one of an upper panel and a lower panel, which are vertically separated and constitute an instrument panel in the widthwise direction of said vehicle body, onto said vehicle body;

attaching said steering column by a column holder to a column-mounting bracket fixed to said vehicle body; and mounting the other of said upper panel and said lower panel onto said vehicle body, wherein said column holder includes a retaining claw to be retained on said column-mounting bracket, and wherein said column-mounting bracket is fixed on a steering support beam so as to be offset from said steering support beam toward a rear side of said vehicle body.

16. The vehicle manufactured by using a method for mounting a steering column to a vehicle body according to claim 15.

17. The method for mounting a steering column on a vehicle body according to claim 15, further comprising:

passing a bolt member including a first externally-threaded portion through a first bolt hole formed in the column-mounting bracket;

passing a second externally-threaded portion through a second bolt hole formed in the column holder and a flange;

combining the first externally-threaded portion with the flange therebetween, screwing a first nut member onto the first externally-threaded portion from above the column-mounting bracket to fasten the bolt member to the column-mounting bracket; and screwing a second nut member onto the second externally-threaded portion from below the column holder to fasten the bolt member to the column holder, wherein said instrument panel is vertically separated into the upper panel and the lower panel at least in the vicinity of the column-mounting bracket.

* * * * *